United States Patent [19]
Meckler

[11] 3,801,284
[45] Apr. 2, 1974

[54] PELTIER EFFECT DIFFUSION APPARATUS
[76] Inventor: Milton Meckler, 16348 Tupper St., Sepulveda, Calif. 91343
[22] Filed: Dec. 21, 1970
[21] Appl. No.: 99,957

Related U.S. Application Data
[62] Division of Ser. No. 744,485, July 12, 1968, Pat. No. 3,671,404.

[52] U.S. Cl............. 23/263, 23/288 K, 202/176, 202/177, 202/187, 202/234, 202/236, 203/11, 203/89, 203/100, 203/DIG. 1, 203/DIG. 6
[51] Int. Cl............................. B01d 3/00, B01j 9/00
[58] Field of Search...... 23/260, 263, 288 R, 288 K, 23/288 H; 202/176, 177, 187, 234, 236; 203/11, 100, 89, DIG. 6, DIG. 1; 62/3

[56] References Cited
UNITED STATES PATENTS

| | | | |
|---|---|---|---|
| 2,555,606 | 6/1951 | Potts | 203/DIG. 6 |
| 2,727,855 | 12/1955 | Goldsbarry | 203/DIG. 6 |
| 2,707,165 | 4/1955 | MacLean et al. | 203/DIG. 6 |
| 3,366,457 | 1/1968 | Hunter | 23/263 |
| 3,393,130 | 7/1968 | Meckler | 202/187 |
| 3,212,999 | 10/1965 | Sommers | 202/163 |
| 3,261,764 | 7/1966 | Casey | 202/187 |
| 2,844,638 | 7/1958 | Lindenblad | 202/187 |
| 2,403,672 | 7/1946 | Matuszak | 203/DIG. 6 |
| 3,671,404 | 6/1972 | Meckler | 202/187 |

FOREIGN PATENTS OR APPLICATIONS

| | | | |
|---|---|---|---|
| 855,458 | 11/1960 | Great Britain | 202/187 |

Primary Examiner—Wilbur L. Bascomb, Jr.
Attorney, Agent, or Firm—Spensley, Horn & Lubitz

[57] ABSTRACT

A thermoelectric diffusion still including a concentric series of sections which sections are closely spaced to define annular diffusion spaces therebetween. A series of thermoelectric elements are positioned within such sections providing heated and cooled surfaces, respectively, on opposite sides of the section as well as facing each other across the spaces to evaporate and condense a feed fluid. Means are provided for collecting condensate from the opposite surface of each of the sections.

6 Claims, 16 Drawing Figures

INVENTOR.
MILTON MECKLER,
By His Attorneys
Spensley & Horn

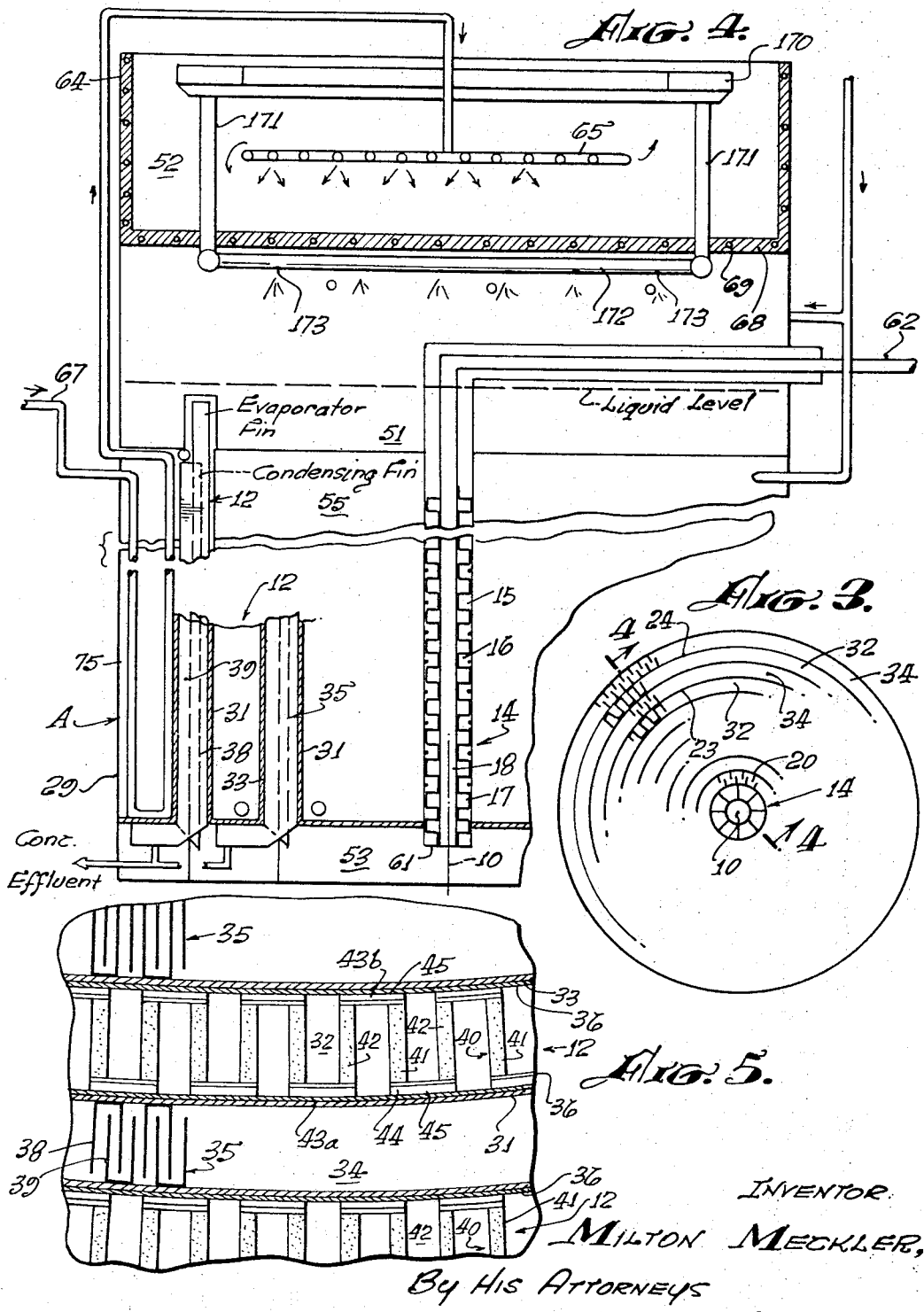

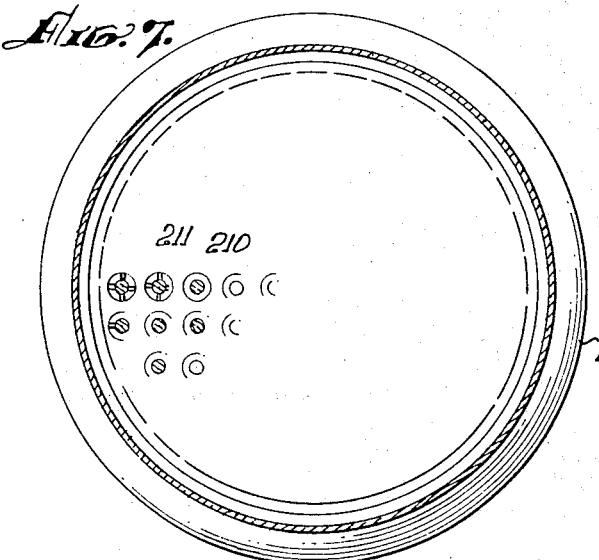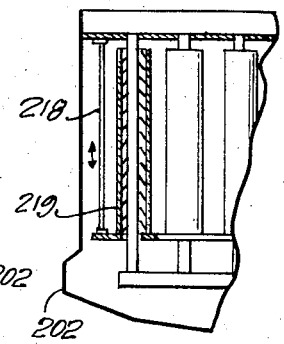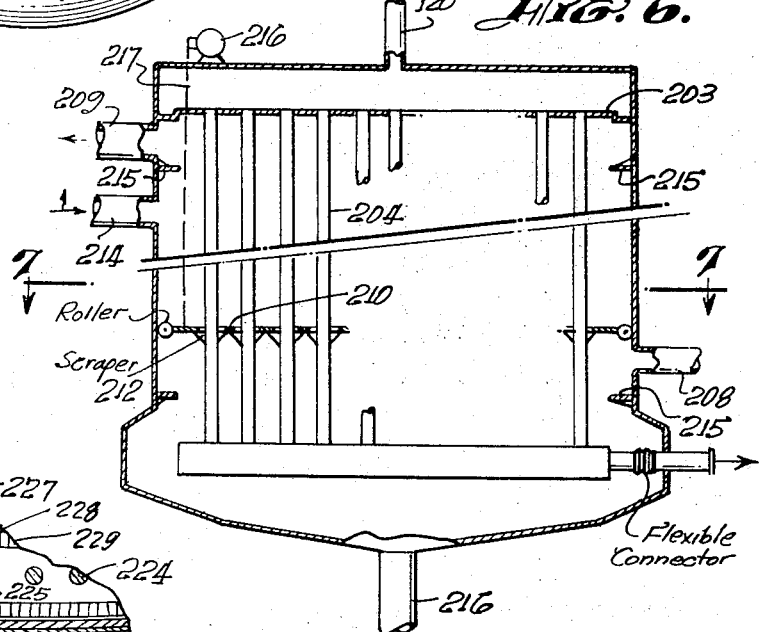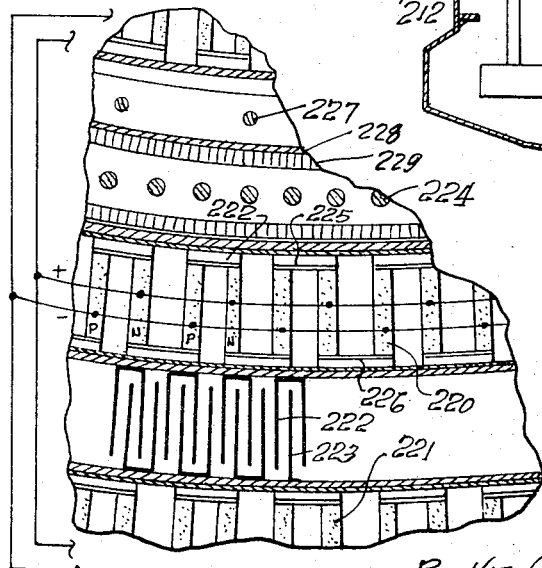

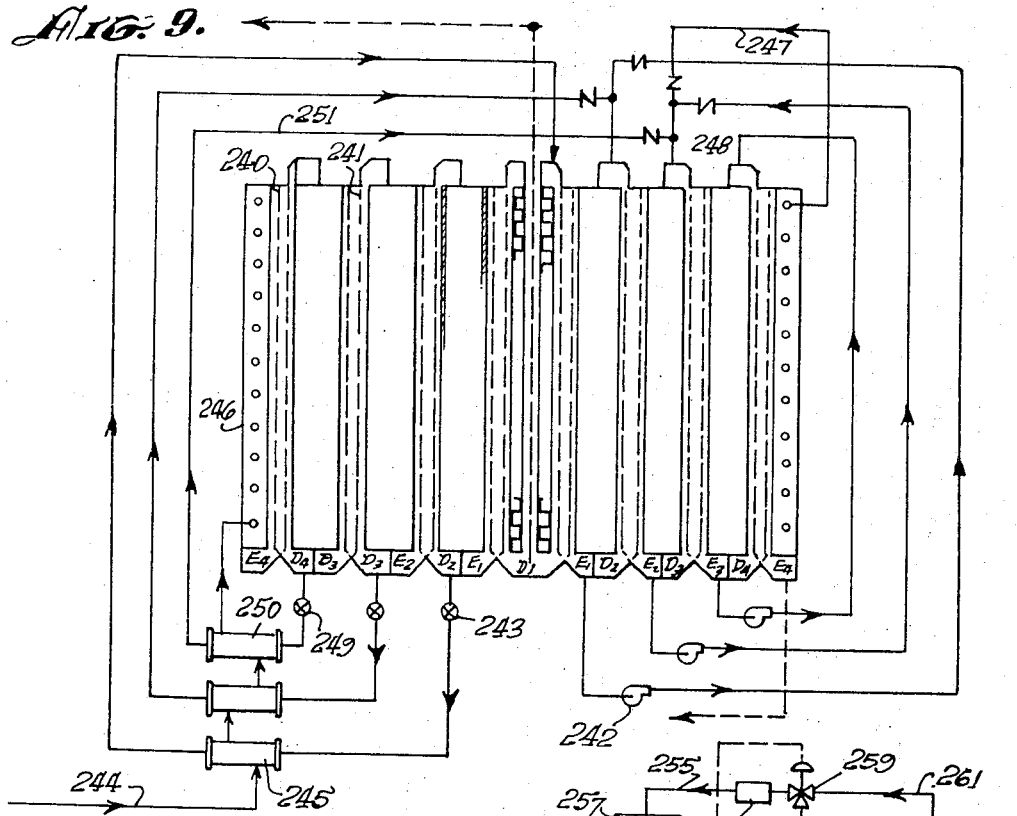
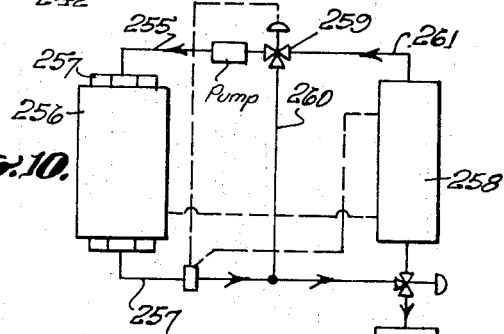
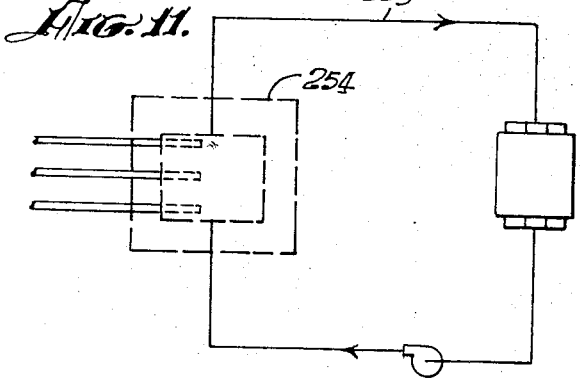

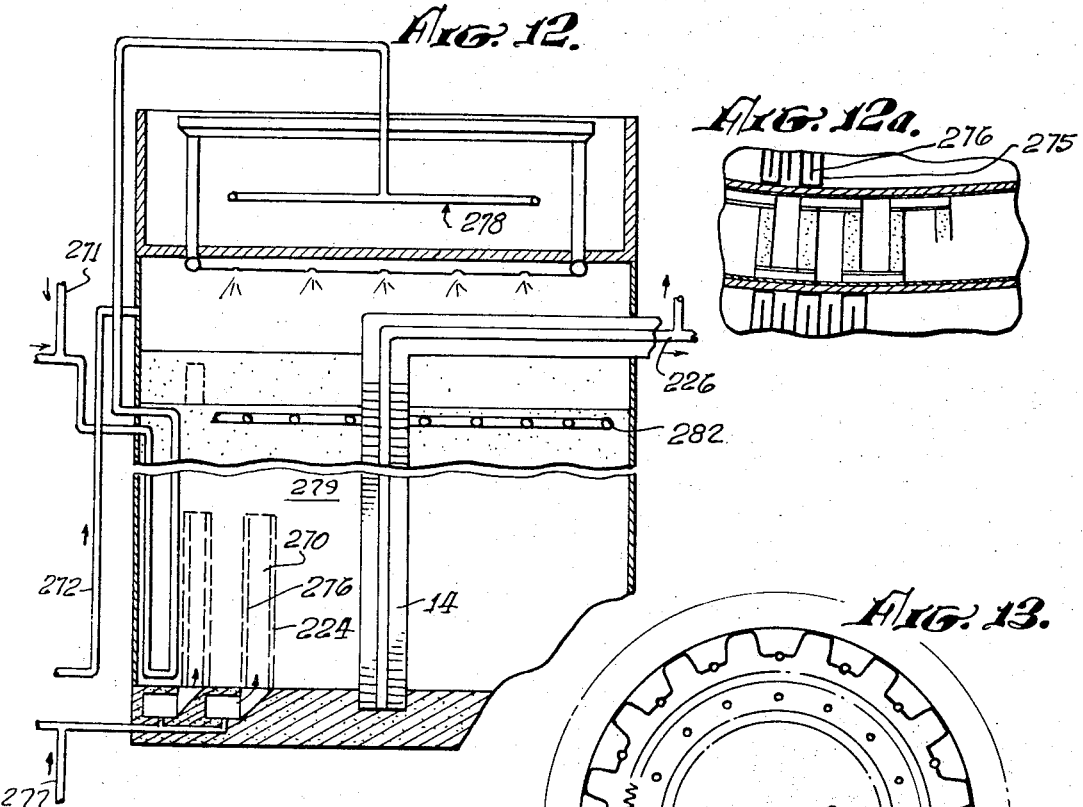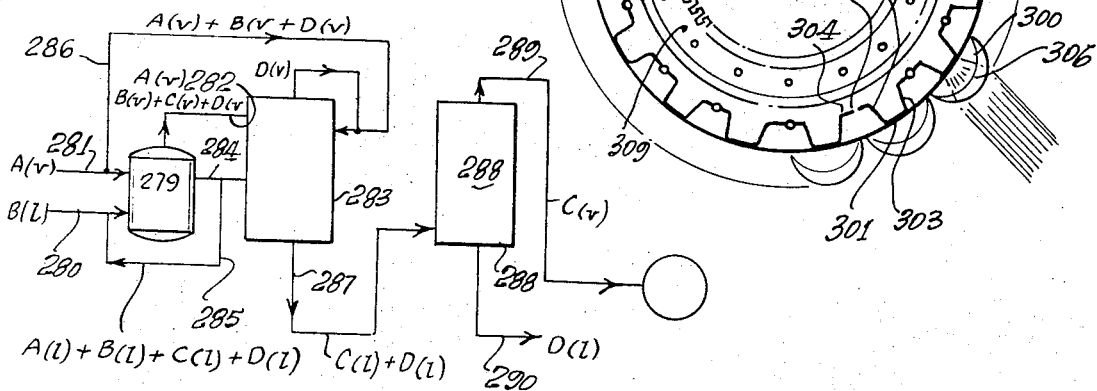

PELTIER EFFECT DIFFUSION APPARATUS

This application is a divisional application based upon my copending continuation-in-part application Ser. No. 744,485, filed July 12, 1968 now U.S. Pat. No. 3,671,404.

BACKGROUND OF THE INVENTION

This invention relates to a method and apparatus for separation of dissimilar materials in a fluid state and more particularly to a method and apparatus for utilizing the Peltier effect as diffusional processes for separation of dissimilar materials and/or reaction of materials for conversion from a reactant to a desired product or for conversion of energy form.

The efficient conversion of salt water or brackish water to potable water is becoming increasingly important in supplying the water requirements of the growing population. Various methods and apparatus have been devised for the conversion of salt water to potable water to render it fit for human consumption or irrigation by evaporation and recondensation. However, at the present state of the art such apparatus is generally bulky and complex, necessitating a multiplicity of pipes and headers and requiring a large heat transfer area for the evaporation of salt water. In present distillation or evaporation processes for the recovery of fresh water from saline waters, the efficiency of the processes heretofore known to the art is low and renders the cost of the production of fresh water sufficiently high as to be commercially impractical. In producing potable water from saline or brackish water the energy requirement depends upon the process selected for the conversion. Distillation processes are primarily the only ones which have been proven on a commercial scale up to the present time for saline solutions as concentrated as sea water. Variations in distillation processes are due primarily to the use of different types of evaporators, to different methods of utilizing energy, and to the way in which heat is transferred. For example, processes have been developed using a boiling type evaporator or flash type, a submerged tube or film type, a stationary surface, or rotating evaporating surface, forced circulation or natural convection, multiple effect of vapor compression, heat transfer through metal walls or by the use of immiscible liquids, and so forth.

The distillation process could be more efficient at higher temperatures which are practical, if not for the scaling problem. Formation of mineral scale on heat exchange surfaces is of two general types, namely, due to the breakdown of bicarbonate to the carbonate ion and $CO_2$, and due to the concentration ratio between feed and effluent which causes the solubility limit of dissolved components capable of scale formation to become exceeded at the operating temperature, and scale forming compounds are precipitated out on evaporating surfaces. Principal minerals of scale are magnesium and calcium which form $CaCO_3$ and $CaSO_4$ as the primary sources along with $Mg(OH)_2$.

Accordingly, it is an object of the present invention to provide a thermodynamically improved apparatus for the separation of two dissimilar materials in fluid form.

It is another object of the present invention to provide an improved method and apparatus for the conversion of non-potable water to potable water.

It is a further object of the present invention to provide such a conversion method and apparatus wherein the apparatus is compact, simple in construction and operation, and efficient.

Yet another object of the present invention is to provide a method of converting brackish or saline water to potable water which process is efficient to a degree not obtainable by methods of the prior art.

A further object of the present invention is to provide a method and apparatus for conversion of non-potable to potable water which method and apparatus are sufficiently efficient and economical in operation as to make such conversion economically practicable.

A further object of the present invention is to provide a method whereby sewage may be treated and fresh water reclaimed in inland populous areas where fresh water supplies are scarce.

Another object of the present invention is to provide a means of economically reclaiming water where only solar cell DC power is available and low weight apparatus of high efficiency is essential.

Yet another object of the present invention is to provide such conversion apparatus which has low power input requirements and operates at sufficiently high pressure as to minimize latent heat energy requirements.

A still further object is to provide an improved method of salt water conversion which permits controlled degassing of the vapor without extensive vacuum purging.

A further object of the present invention is to provide a conversion apparatus which operates at temperatures below boiling and minimizes liquid carryover problems.

A still further object of the present invention is to provide an improved method and apparatus for salt water conversion which makes such conversion possible in remote regions or regions in which unlimited power supplies are not available.

A still further object of the present invention is to provide a saline conversion unit of the type described which can be employed where available saline water at high pressure can be used directly without need for pressurization.

A further object of this invention is to provide a means whereby diffusion of water vapor can take place at temperatures above 212°F with relatively high concentration ratios without formation of scale on evaporating surfaces.

A further object of this invention is to utilize carbon dioxide to surpress formation to scale in desalination apparatus.

It is another object of the present invention to provide such a system which includes means for descaling mineral deposits within the system by thermal or mechanical means, or both, and to recover useful minerals from scale produced.

It is a further object of the present invention to provide a saline water conversion chemical reactor or distillation system which includes nuclear isotope and thermoelectric elements arranged in concentric sections as heat sources, thermoelectric generators and heat pumps for utilizing the system in areas remote from conventional electric power.

Yet another object of the present invention is to provide a system adapted to be utilized at high pressure by means of a pressure cylinder in the system.

A further object of the present invention is to provide an improved desalination system employing a solar operated diffusion still and related equipment.

A further object of this invention is to provide economical desalination or distillation by placing entire apparatus below fluid already under high pressure, e.g., sub sea, to utilize available pressure to permit operation at reduced latent heat requirements.

SUMMARY OF THE INVENTION

The apparatus of the present invention comprises in general terms a thermoelectric diffusion still which includes a series of endless walled sections, which sections are closely spaced and between which a series of thermoelectric elements are positioned as heat pumps and generators. Means are provided for the passage of distillate along the radially outer surface of each of the concentric sections. Water vapor is diffused from the thin film of liquid passing along the outer surface of each section, across a narrow gap or endless space to the inner surface of the next adjacent concentric section which serves as a condensing surface. The heat for the diffusion of the water vapor at a predetermined constant temperature, which heat requirement may be variable as in the case of separation of binary mixtures, is provided by thermoelectric heat pumping and generation of electric power from the available heat source. The heat pumping and generation occurs from the first concentric section relative to the axis of the apparatus in series outward radially to the most distant section from the axis. Diffusing vapor is thus evaporated and condensed respectively from one section to another requiring only the current necessary to pass the heat flux from the inner to the outer surface. Means are provided for removing the distillate from the inner surface of the sections and the effluent from the outer surface of the respective sections.

For most distillation processes used in recovery of fresh water from saline waters the energy requirement bears no direct relationship to the latent heat of vaporization. In these systems extensive heat transfer surface must be provided to largely recover the heat to vaporize this water if the energy requirement is to be maintained within practical and commercially acceptable limits. Also, high temperature differentials are necessary to achieve signifcant mass transfer rates.

The present invention is a method and apparatus for separation of materials, distillation of one material from another, and conversion of chemical reactance to end products, which differs in principal from known processes. The energy requirements of the present invention which utilizes a thermoelectric diffusion still in accordance with the present invention is a function of the latent heat of vaporization of water or one or more components of the feed stock.

In accordance with the present invention rather than providing enormous surface, thereby equipment bulk, for separate evaporation and condenser functions, diffusion still heat transfer surface requirements are minimized by a compact design which reduces both equipment and maintenance costs while still permitting heat economy through temperature exchange and flashing techniques between incoming feed and outgoing distillate and effluent streams.

The present invention serves to reduce the cost of recovery of fresh from saline water by improved thermodynamic efficiency. The direct use of electrical energy which is available at any required temperature level, or waste heat from nuclear reactors or solar energy, offers advantages over the use of fossil fuels whose utilization efficiency is a direct function of operating temperature levels. The present invention promotes diffusion by selected operation which suppresses boiling and attendant scaling and liquid carryover problems and achieves high mass transfer rates through greater proximity of evaporative and condensing surfaces.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

DESCRIPTION OF THE DRAWINGS

FIG. 3 is a plan view in section taken through the diffusion still along line 3—3 of FIG. 1;

FIG. 4 is a sectional view in elevation taken along line 4—4 of FIG. 3;

FIG. 5 is an enlarged partial schematic view of the chamber areas of the still;

FIG. 6 is a view in elevation partially in section of a mechanical means for descaling the preheating section of the system and recovering deposited minerals;

FIG. 6a is a partial view of an alternate descaling apparatus;

FIG. 7 is a plan view taken along line 7—7 of FIG. 6;

FIG. 8 is a plan view in section comparable to FIG. 5 of a first alternative embodiment of the diffusion still of the present invention;

FIG. 9 is a partially schematic view in section of a second alternative embodiment of the diffusion still of the present invention employing series rather than parallel flow;

FIG. 10 is a schematic view of the diffusion apparatus of the present invention utilized as an aqueous homogeneous reactor system;

FIG. 11 is a schematic diagram of a diffusion still of the present invention employed in a desalination or distillation system employing a remote nuclear reactor as the heat source;

FIG. 12 is a sectional view showing a presently preferred embodiment of a diffusion still used for the separation of binary mixtures;

FIG. 12a is an enlarged view of a portion of the annulus area of the still of FIG. 12;

FIG. 13 is a partially schematic view of a diffusion still in accordance with the present invention adapted to be operated by solar heat; and, FIG. 14 is a schematic view of a distillation system employing the still section of FIG. 9 and the reactor apparatus of FIG. 12.

Figure 1:
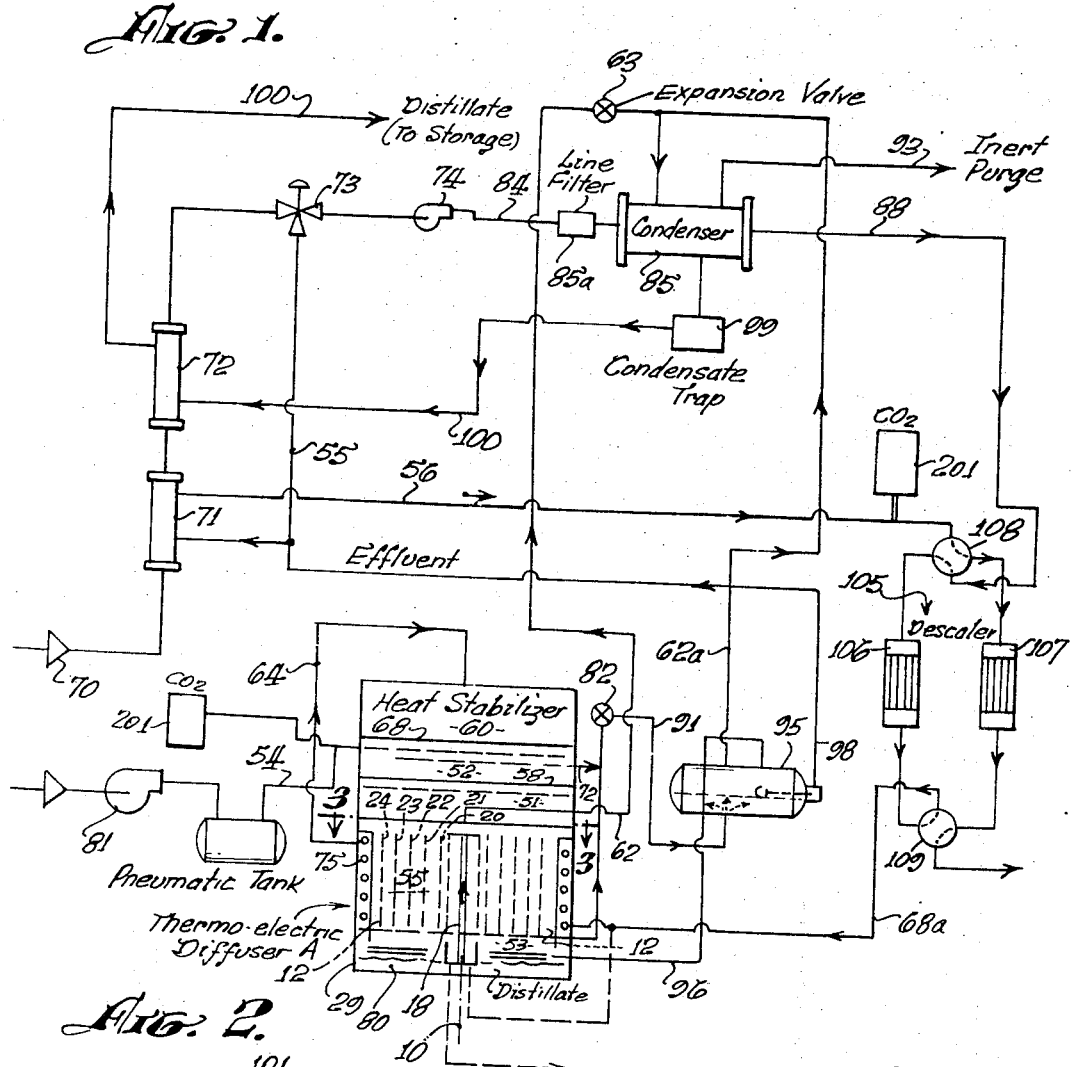
FIG. 1 is a flow diagram of a presently preferred embodiment of the present invention.

Although not limited thereto the present invention is particularly adapted to the separation of distillable products such as the conversion of saline water to potable water and is therefore described in connection therewith throughout the following description of a presently preferred apparatus and its method of operation. It will be understood that the concept and means of the present invention can be utilized to separate other materials of dissimilar nature. That is, rather than the distillation of saline water to produce potable water, the method and apparatus of the present invention can obviously be used to separate a lighter fraction of fluid from a heavier feed fluid which feed fluid can be liquids of various compositions.

The present invention utilizes thermal or vapor diffusion or a combination thereof as the distillation process occurring between successive shells in the apparatus. This diffusion process takes place at temperatures below the boiling point of the feed water and is a well-known phenomenon. Thus, by utilizing vapor diffusion a thin film of saline or brackish water, hereinafter termed feed water, is supplied to a surface which is at a predetermined pressure and temperature below the boiling point of water but at which the pressure maintained at the surface of the film is sufficient to provide an appreciable mass transfer of vapor from the surface of the water. That is, at any given pressure, provided the solution is maintained at a predetermined temperature which is below the boiling point of the solution. The present invention utilizes a second surface closely adjacent to the film of feed water which second surface is a condensing surface maintained at a temperature less than the temperature of the first surface, hereinafter termed the evaporating surface.

The present invention also utilizes the diffusion gap thermoelectric principals to cause a reactant fluid to migrate to the cold side of the diffusion gap to there react with another reactant introduced into the diffusion gap. The products of the reaction are removed from diffusion gap and thereby reactants are converted to desired products.

By proper maintenance of the temperature of the evaporating surface and the lower temperature of the condensing surface together with the pressure and space therebetween, the present invention achieves a transfer of the water vapor from the first to the second surface where it is condensed as fresh water. Mass transfer which is the primary limiting or controlling factor in the diffusion still operation of the present invention will vary directly in relation to the distance separating the evaporating and condensing surfaces. The rate of mass transfer under any given set of operating conditions will increase as this distance is decreased. A presently preferred distance, temperature differential, and operating pressure, is discussed hereinafter in connection with a presently preferred embodiment of the present invention.

In accordance with the present invention, in order to achieve the temperature differential between the evaporating surface and condensing surface of the apparatus, a thermoelectric heat pump is utilized. The use of thermoelectric elements for heat pumping is known to the art and is described in texts such as "Semiconductor Thermoelements and Thermo-electric Cooling" by A. F. Ioffe, Info Search, Ltd., 1957, and in various patents such as U.S. Pat. No. 2,959,017, Yoeman, et al., "Heat Exchangers Employing Thermo-electric Elements for Heat Pumping," issued Nov. 9, 1960, and U.S. Pat. No. 2,978,875, Lackey et al., "Plural State Thermo-electric Heat Pump," issued Apr. 11, 1961. Briefly, a thermoelectric heat pump is a device utilizing Peltier phenomenon of heat absorption and heat dissipation at junctions between bodies having different thermomotive properties, which phenomenon occurs when electric current is passed through the bodies. A number of junctions are coupled and generally employed in a heat pump of this type, the couples being physically and electrically interconnected to form a thermoelectric array. The particular arrangement of thermoelectric elements employed in the present invention will be discussed more fully hereinafter in connection with the illustrative embodiment of the present invention. A thermoelectric element of the type employed in connection with the present invention typically comprises an "N" type thermoelectric element and a "P" type thermoelectric element. The "N" and "P" type components are made from semiconductor materials used in thermocouples. An example of "N" type material is an alloy of bismuth-teleride and bismuth-selenide having a formula of 75% $Bi_2Te_3$ 25% $Bi_2Se_3$. An example of "P" type material is an alloy of bismuth-teleride and antimony-teleride having the formula 25 percent of $Bi_2Te_3$ 75% $Sb_3Te_3$. Such elements are designated hereinafter as "P" type or "N" type to indicate the thermoelectric property thereof. The terms "P" and "N" have found wide usage in the semiconductor art, the former term designating material having an abundance of "holes" and the latter term designating a material having an abundance of free "electrons." Semiconductive components including antimony and bismuth have been found suitable for use respectively as "P" and "N" type materials. Such materials or the formation of thermoelectric pumping elements are not claimed as novel per se in the present invention, but an example will be set forth of the type of such element employed in connection with the apparatus of the present invention.

Referring now to the drawings, in FIG. 1 a flow sheet of an illustrative embodiment of the present invention is shown with the thermoelectric vapor diffusion still portion thereof indicated in general as A. In FIGS. 3, 4 and 5 there are shown construction details of such a still in accordance with the present invention. Thus, referring to FIGS. 1 and 3 through 5, the apparatus in accordance with the present invention comprises a series of cylindrical shell sections 12 concentrically oriented about an axis designated as 10—10 in FIGS. 3 and 4. Positioned along this axis and having a length substantially equal to the length of the shell sections 12, there is positioned a starting column 14, which includes a heating element which by means of electrical current supplied from a power supply, not shown, is capable of achieving a temperature which can be regulated to a predetermined temperature to thus serve as an initial heat source for bringing the temperature of the starting column to the specified temperature. The starting column 14 is a heat pump unit in the form of an axial annular heater with thermoelements 16 in the annular portion 17 and a conduit 18 for the passage of fluid in the interior of the annulus. The resistance heating element 15 is imbedded resistance wire wound about the column at the exterior surface thereof and serves to raise the surface of the starter so that vaporization is initiated and apparatus and fluid temperatures are gradually increased through recirculation of deionized charge to a point where thermoelements 16 shall be capable of sustaining continuous operation with raw feed or starter column 14 can consist of annulus of FIG. 8.

As shown in the drawings and particularly in FIGS. 3, 4 and 5, the diffusion section of the thermo diffusion still A is made up of a series of concentrically oriented cylindrical bodies as described hereinbefore positioned within a structural housing 29 capable of withstanding operating pressures as discussed hereinafter. Each of the bodies is in turn made up of an inner and outer shell of heat conductive structural material to define an inner and outer wall between which are positioned the thermoelectric heat pump units. That is, as shown in FIG. 1, a series of equally spaced apart cylindrical bodies designated as 20, 21, 22, 23 and 24, in the FIGURES are spaced about the central axis of the apparatus. Each of the cylinders in turn has an outer wall, 31 and an inner wall 33. An annular space 32 is then defined between the walls of the body and an annular space 34, is defined between the outer wall of one cylindrical body and the inner wall of the next outwardly spaced cylindrical body. It is within the annular space 34 defined between the outer wall of one cylinder and the inner wall of the next cylinder that the vapor diffusion takes place in accordance with the present invention. Between the inner and outer wall of each body the heat pumping heat source, thermoelectric generator units are positioned. Thus, the outer wall 31 of each cylinder is an evaporating surface and the inner wall 33 of each cylinder is a condensing surface. Within the annular space between successive bodies there is provided a plurality of interleaved fins as described more fully hereinafter but which are designated generally as 35 in FIG. 5.

The inner surface of the walls between which the thermoelectric elements are positioned are insulated with a material of heat conducting type. That is, an electrically insulating but heat conducting type of insulation such as mica filled epoxy resin is positioned against the interior surfaces of the cylindrical body as shown by an insulating layer designated as 36 in FIG. 5. Between these electrically insulated surfaces a heat pump in the form of a battery of thermoelectric couples 40 is arranged. Each thermoelectric couple comprises two arms 41 and 42 respectively, formed of different thermoelectric material. At one end thereof each arm is electrically connected to the other arm of the couple by means such as a jumper 43b. The thermoelectric couples are of known form in which each couple contains an arm of P-type material and an arm of N-type material whereby the passage of current through the couple will produce a Peltier effect resulting in one of the junctions being heated while the other junction is cooled. The cold junction is arranged in heat exchange relationship with the condensing wall of each cylindrical body and the hot junction is arranged in heat exchange relationship with the evaporating wall of each of the cylindrical bodies. As will be apparent, each battery of thermoelectric couples may be formed of a plurality of couples extending longitudinally of the tube or of a plurality of couples extending circumferentially of the tube.

In the illustrated embodiment of the invention the couples are arranged circumferentially with the P-type arm of one couple connected by a jumper plate 43b to the N-type arm of the adjacent couple. The last arm on each end of the circumferentially oriented heat pump has its free end connected to the conductor (not shown) by means of which the thermoelectric heat pump may be coupled to a source of direct current, either a battery, a DC thermoelectric or solar generator, or rectifier. The alternate hot and cold thermocouple junctions 44 and 45, provide a hot junction, thermally connected to the evaporative wall 31, of each cylindrical body, 20 through 24 and a cold junction thermally connected to the condensing wall 33 of each of the bodies. When direct current is caused to flow from the P-elements to the N-elements, the interconnecting jumper means 43a becomes hot and current flowing from N to P causes the jumper means 43b to become cold in accordance with the known Peltier effect. The difference in temperature between the evaporating surface of each of the cylindrical bodies and the condensing surface of the next adjacent cylindrical body is designated herein as $\Delta T$.

Figure 2:
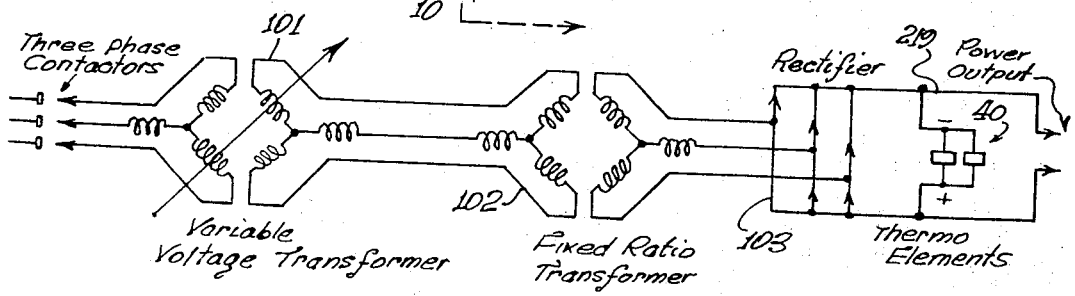
FIG. 2 is an illustrative circuit diagram.

A circuit diagram showing an illustrative power supply to thermoelements is shown in FIG. 2. Electric power to the thermoelectric couples contained within the cylindrical shell bodies is similar for each thermoelectric couple 40 and one only is shown in connection with the power supply circuit. The power supply to each couple must be direct current and should preferably have less than 5 percent ripple. In the illustrative circuit a variable voltage control transformer 101 is connected to a source of three-phase power (not shown). The transformer is driven to predetermined voltage requirements by a modulating control such that only the voltage required for a given load condition is imposed on the system. A fixed ratio transformer 102 is provided to adjust the voltage from the full-wave rectification of AC to a lower DC voltage required for operation of the thermoeleements 40. The fixed ratio transformer serves to achieve the desired input voltage to a rectifier 103 when the variable transformer is positioned to its maximum voltage ratio. Thus, the fixed ratio transformer permits the full utilization of different rectifier input voltages when several separate units are combined to form one or more sections which are connected into one variable voltage transformer. The frequency employed in the apparatus of the present invention can be, for example, 60, 400 or 800 cycles; the required control and transformer sizes being reduced as greater frequencies are employed while the rectifier size remains the same. It is desirable to utilize three-phase power supply because of the simplicity of rectifying to a suitable DC voltage, however, current generated from direct energy conversion of heat source is possible. Similar circuitry can be employed for smaller apparatus in accordance with the present invention to utilize single phase power and controls. Use of direct energy converters which provide DC output would eliminate need for rectification.

As discussed hereinbefore, when a film of feed water is caused to pass over the evaporating surfaces a quantity of vapor will escape from the surface thereof and will be condensed on a cooler surface if the cooler surface is closely spaced adjacent to the surface of the water being passed over the evaporating surface. This will occur at a temperature below the boiling point of water and the amount of vapor driven from the water and condensed on the cooler evaporating surface will be dependent upon the temperature differential $\alpha T$, the space between the evaporating surface of the water and the condensing surface of the vapor, and the pressure between the surfaces. In order to maximize the evaporating and condensing surfaces and to minimize the spacing therebetween, a system of interleaved fins has been utilized in the presently preferred embodiment of the present invention. In addition to being interleaved the fins are perforated to present a surface which is fully wetted and which is conductive to film flow of feed water and promote high heat transfer rates at the condensing surface.

In thin film designs, at low feed rates, if there is insufficient wetting of the heated surfaces a low evaporation rate occurs. The use of perforated finned heat transfer surfaces in accordance with the present invention serves to provide optimum thermodynamic conditions for the wetting and spreading of the liquid feed on a heat transfer surface. The use of perforated surfaces generates high adhesion forces between the perforated solid and the molecules of the liquid.

When a thin film passes over a vertical surface and is disturbed by wave motions and ripples, significant increases in heat and mass transfer rates usually occur due primarily to vigorous bulk mixing by rippling, and in an increase in interfacial area caused by wave motion ripples.

Due to the fact that concentric annular chambers in close proximity are utilized for mass transfer of water vapor at relatively high pressures with respect to ambient, a relatively small pressure vessel is required for a large throughput. Only the exterior wall 29 of the apparatus need be structured as a pressure vessel since all intermediate annular chambers are operated at the same pressure and, therefore, no pressure differentials exist.

Thus, referring particularly to FIGS. 3 and 5 each of the fins is generally U-shaped in configuration with a length somewhat less than the radial distance between the adjoining surfaces defining each annular chamber 34. Each of the fins has a distance between the legs of the U which is approximately equal to twice the desired spacing between the evaporating and condensing surfaces. Thus, as shown in FIG. 5, when the U-shaped fins are interleaved the distance between the leg of a fin attached to the evaporating surface and the next adjoining leg of the fin attached to the condensing surface is equal to the distance desired for the water vapor to travel. Accordingly, a continuous series of such U-shaped fins are affixed in staggered relationship circumferentially around the evaporating wall of a cylindrical body and the condensing wall of the next outwardly spaced cylindrical body. Within the annulus 34 there is thus provided a continuous circumferential series of alternately occurring evaporating and condensing fins. Each of the fins is formed of relatively thin heat conducting material such as aluminum brass, admiralty brass, or the like, and the legs of each fin member can be continuously perforated or coated with cladding or film that promotes high rate of heat transfer. By means of such perforations it has been found that water passed to the fins at the upper end thereof flows in a thin film configuration downwardly along the surface of the fin. By the use of interleaved surfaces each condensing surface faces two evaporating surfaces and vice-versa. The evaporating fins are designated generally as 38 while the condensing fins are designated as 39. In the presently preferred embodiment the fins are spaced to obtain a diffusion gap from one-sixteenth to one-half inch the section height.

The shells containing the thermoelements with the fins positioned between shells are enclosed with a distillation portion 55 of the still housing 29. The still housing 29 includes also a controlled degassing section 51, a heat stabilization portion 52 and a distillate chamber 53 in the illustrative embodiment. The entire still housing 29 is constructed to withstand appreciable interior pressures such as 500 p.s.i.a. in the illustrative embodiment. The entire housing is maintained at the operating chamber pressure by means of a compressed air line 54. The interior pressure of the still housing can also be maintained by the use of pressurized gasses such as $CO_2$ or $N_2$ or combinations thereof. The shell sections are disposed within the still section 55 as discussed hereinbefore. Both the evaporating 38 and condensing 39 fins are in communication with the distillate chamber and with the evaporating fins 38 in communication with the degassing section 51. Thus, a fluid tight partition 58 divides the degassing section 51 from the still section 55 and forms the upper wall of the still section. The evaporating fins 38 protrude into the degassing section where feed water accumulates above the partition 58. Due to gravity feed water is conducted down the evaporating fins 38 and through the partition 58 to progress down the evaporating fins in thin film quantity flow. At the lower end of the fins is the distillate chamber 53 into which the distillate flows from the condensing fins 39. The level of distillate collected in the distillate chamber is above the lower end of the starting column 14 such that the lower open end 61 of the starting column 14 is immersed in the distillate and due to the pressure upon the distillate surface the distillate is forced up the starting column and from the still 55 through the distillate outlet line 62.

The heat stabilizing section 52 provides means for uniformly mixing the preheated feed water which enters the still through the feed water inlet line 64 having previously been preheated as discussed hereinafter. The heat stabilizing section assures that the feed water is conducted to the evapoating fins at the maximum uniform temperature necessary to promote diffusion in the annular space. After being conducted into the still housing 29 through inlet line 64 the feed water is fed uniformly into the section 52 by means of a sparger header 65 which distributes the feed water in a swirling manner. The heat stabilizing section 52 is separated from the degassing section 51 by a partition 68 upon which the feed water accumulates. Heating means such as imbedded electrical resistance wires 69 are imbedded in the partition 68 and side walls to maintain the temperature of the feed water. Means are provided for passing the feed water from the heat stabilizing section to the degassing section. In the illustrative embodiment the distribution means includes a trough-like member 170 into which the feed water passes as the water level reaches the height of the trough, such that the hotter level of water is passed from the section 52. The feed water then progresses down standpipes 171 to a spray header 172 which has a plurality of spray heads 173 from which the feed water is sprayed into the degassing section. Spraying of the heated water allows accumulated gasses to be expelled from the feed water and such gases can be bled from the section 51. The feed water is then conducted down the evaporating fins 38 as described hereinbefore.

A feed water jacket 75 is provided within the still housing surrounding the shells and in heat transfer relationship with the outermost of the condensing fins 39 in order to extract heat from the condensing fins for further preheating of the feed water and obtain benefit of condensing distillate of final stage without use of electrical energy. Thus, the feed water enters the still housing through inlet line 67 (FIG. 4), passes through the feed water jacket 75 and from the jacket through feed water inlet line 64.

Referring now to FIG. 1, a flow sheet of the presently preferred embodiment of the present invention is shown and a discussion of operation will serve to describe the various elements contained in the overall system. The operation of the apparatus is commenced by charging it first with deionized water charge and after reaching steady state temperature conditions introduce feed water from a source 70 which supplies the feed typically at a temperature of approximately 60°F. The feed water is conducted through a first heat exchanger 71 of the type well known to the art of preheating by effluent as described hereinafter. The feed passes through a second preheating heat exchanger 72 for preheating by distillate. A three way valve 73 controls routing of the feed and is at this time of starting up in full by-pass position. A feed pump 74 maintains circulation throughout the system. At full by-pass the deionized water charge is conducted through the valve 73 through by-pass line 54. The heat stabilizer section 52 is put into operation by supplying power to the resistance heating elements 69 therein and the compressor, or pressure cylinder 81, is operated to pressurize the system. The exhaust valve 82 is a bleeder valve and is set at the pressure to be maintained in the diffusion still A.

At a predetermined temperature below desired still pressure, a pressure switch (not shown) is activated to supply power to the resistance heating elements 15 on heat source in FIG. 4, in the starting column 14 to commence heating of the first shell of thermoelements to the temperature at which water vapor will be diffused from the thin film of feed water flowing over the evaporative fins. At that point the three-way valve 73 is moved to the open position at which feed water is caused to flow in input line 84 to line filter 85A and then to the condenser 85. The feed water then passes through the low temperature jacket of condenser 85 for further preheating by higher temperature fluids as described hereinafter. The feed then passes through inlet line 88 to the final preheating jacket 75 surrounding the final stage of the concentric diffusion stages in the still housing after which it passes into the still through line 64 as described hereinbefore.

When the desired pressure is reached within the still, a bleeder valve 82 opens and serves as a back pressure control. Inert gas bleeds from the chamber through gas line 72 into the flash tank 95 to automatically maintain the desired pressure in the system. The flash tank 95 serves as the pressure disengaging point of the system in the manner well known to the art. The air compressor is cycled or pressure cylinder operates by means well known to the art to maintain chamber pressure.

At this time electric power is supplied to all thermoelement stages and the still is at a typical pressure of 500 p.s.i.a., for example, with feed water flowing over the evaporating fins diffusion commences and condensation of distillate on the condensing surfaces occurs. At this point the diffusion chamber temperature is above 300°F and ΔT is approximately 8°F. It should be noted that a substantially greater temperature differential is necessary between the thermoelement hot and cold junctions to obtain 8°F as ΔT between evaporating feed and condensing vapor distillate. This is due primarily to thermoelement junction losses, boiling point rise effect between incoming feed and outgoing effluent, and heat transfer temperature driving force between evaporating feed and the hot fins on one side and condensing vapor and cold fins on the other side of the diffusion annulus. At higher temperature levels the corresponding difference in equilibrium water vapor pressure between evaporating feed and distillate for a fixed Δ T of 8°F is greater than at a lower temperature level. For example, while 8°F can produce a water vapor differential of 29.3 p.s.i. between feed and distillate when feed and distillate temperatures are 456° and 464°F respectively, at corresponding temperatures of 212° and 220°F the water vapor differential would be 2.5 p.s.i. or approximately one-tenth. Since the rate of mass transfer across the diffusion gap varies directly with this pressure differential, high operating temperature levels are desirable since higher coefficients of performance of performance of the thermoelectric heat pump are possible with lower Δ T. Upon Stabilization at this point power is supplied to the thermoelements 40 to raise evaporating and condensing surfaces to the desired temperature.

The heat stabilizer section operates as described hereinbefore to maintain constant feed water temperature and evaporation and condensation commences. The concentrated effluent conducted from the still through outlet line 96 flashes at the reduced pressure of the flash tank 95. Multiflash steps can be utilized by a plurality of such tanks. The hot effluent then passes from the flash tank 95 through line 98 to the high temperature side of the heat exchanger 71. The hot distillate is conducted through high temperature line 62 to a pressure reduction valve or expansion engine capable of recovering hydraulic energy, where the hot distillate flashes to vapor in passing from the high pressure to the low pressure side of the system. The vapor then passes to the high temperature side of the condenser 85 where it is condensed while preheating the incoming feed. Similarly, the vapor which has flashed in the multi-flash tank 95 passes through line 62a and into condenser 85. The hot condensate passes through a condensate trap 99 to the heat exchanger 72 and out of the system through outlet line 100.

From the heat exchanger 71 the effluent prior to passing from the system passes through a preheater-descaler unit designated generally as 105 in FIG. 1. As discussed hereinbefore a primary problem with prior art distillation systems has been scaling due to formation of mineral deposits. Scale in the distillation of sea water results from the following reactions:

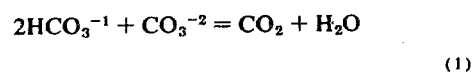

(1)

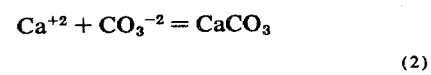

(2)

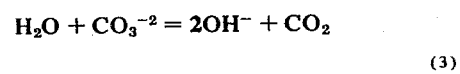

(3)

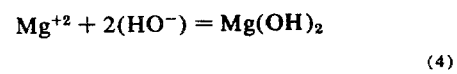

(4)

$$Ca^{+2} + SO_4^{-2} = CaSO_4 \tag{5}$$

From equations (1) through (5) above, it can be seen that the formation of $Mg(OH)_2$ or $CaCO_3$ scale depends upon the release of $CO_2$. In the apparatus of the prevent invention the system is pressurized so that $CO_2$ cannot escape and appreciable carbonate scale will not form. The effect of salts with inverted solubilities is illustrated in equation (5). An increase in temperature of solutions containing calcium sulfate tends to decrease its solubility and favor scale formation. As a rough indication of the calcium sulfate temperature concentration relation while below 185°F, sea water can be concentrated to four times its normal strength without formation of sulfate scale. At 300°F substantially no concentrating can be done without the risk of scale formation.

Sea water is a complex solution containing an average of 3-½ percent dissolved salts. About 90 percent of the mineral content is sodium chloride and 5 percent is magnesium and calcium ions, which are the chief scale forming elements. The alkalinity of sea water is due to the bicarbonate ion which is present to the extent of 0.4 percent. It is the most important ion in alkaline scale formation, i.e., the calcium carbonate and magnesium hydroxide scales. The sulphate ion, having about 20 times the concentration of the bicarbonate ion is responsible for the tenacious calcium sulphate scale which usually forms at evaporation temperatures of above 250°F. It was recognized early that scale deposits were related to the inverse phenomenon of these chemical compounds. Although the solubility decreases with increasing temperature, chemical changes which occur in heating sea water play the most vital part.

The reactions which apply are shown above. Heat breaks down the bicarbonate ions to carbon dioxide which escapes as a gas. The carbonate ion combines with calcium to produce the insoluble precipitate calcium carbonate. If higher temperatures are involved the carbonate ion breaks down into more carbon dioxide and the hydroxyl ion is formed. This produces magnesium hydroxide scale as temperatures rise above 250°F. The remaining calcium ions combine with sulphate ions to produce calcium sulphate scale. The one point to be noted is that the release of carbon dioxide is necessary in the formation of alkaline scale and therefore plays an important part in the calcium sulphate scale formation.

As long as evaporation temperatures remain below 250° acid, especially sulphuric acid ($H_2SO_4$) is the most effective and lowest cost method of scale prevention. However, the use of sulphuric acid is a paradox. Being a strong acid it is used to remove a weak one, i.e., carbonic acid ($CO_2+H_2O$) from sea water. In the oceans, however, carbon dioxide or rather the carbonic acid derivatives are necessary to maintain the proper pH conditions and stabilize the calcium and magnesium ions. Therefore, it would appear that removing carbon dioxide from water is contrary to the natural method for holding the carbonates in solution. Recent data indicate that when full strength sea water was heated in a closed system no scale was formed in the evaporator below 300°F. Yet it is known that calcium carbonate scale forms at temperatures above 160°F in some stages of flash distillation condensers. It becomes obvious then that the bicarbonate ion decomposed because the system pressure was too low to prevent it. However, at 300°F higher pressures are encountered and the carbon dioxide being under greater pressure remains bound up in the bicarbonate ion. This important feature is one of the keys to the successful operation of the proposed apparatus.

Alternatively to employing the compressor 81 for pressurizing the system, a pressure cylinder of $CO_2$ shown dotted as 201 can be employed to supply partial pressure of carbon dioxide in the still diffusion space. As shown in FIG. 1 the $CO_2$ can be added to the liquid feed line 56 prior to entering the diffusion still to obviate the pressurization of the condensing and heat exchange equipment in the system while still suppressing breakdown of the bicarbonates and the other chemical reactions which result in scale formation as discussed above. Additionally, it can be seen that the source of preheat can be nuclear isotopes or nuclear reaction occurring directly within the preheating space.

In prior art devices the amount of distillate formed is proportional to the amount of heat passing through the heating surface. The thin film of sea water immediately adjacent to the wall of a heat transfer surface is hotter than the rest of the solution and, therefore, calcium sulfate will be deposited on this layer rather than in the body of the solution. Consequently, anhydrous calcium sulfate separates out on the heat transfer surfaces significantly decreasing the heat transfer rate. When operating above its solubility level calcium sulfate scale precipitates almost immediately after the evaporating surface is put into operation, and continues at a rapid rate directly proportional to operating temperature level requiring frequent shutdowns for cleaning of heat transfer surfaces.

The apparatus of the present invention permits operation at higher evaporative and condensing temperatures by eliminating the scaling problems in the following manner. By operating the diffusion section at pressure levels in excess of boiling atmospheric and with controlled degassing in the diffusion still A, the formation of carbon dioxide is suppressed and the bicarbonate ion is not allowed to break down to form the carbonate ion which sequentially operates to produce calcium carbonate directly and to produce magnesium hydroxide indirectly through intermediate reactions. The elimination of calcium sulfate scaling is achieved by the presently preferred embodiment of the present invention by preferentially causing calcium sulfate to precipitate out on heat transfer surfaces of the regenerative type preheater-descaler 105 through which the feed water is conducted prior to entering the still section through line 88 after passing from the preheaters 71, 72 and 85. The preheater-descaler includes two heat exchangers arranged in parallel and designated as 106 and 107. Valves 108 and 109 which are four-way diverting valves determine the routing through the preheater-descaling section.

In the preheater-descaler 105 mixer raw feed and recycle feed solution is heated to within approximately 50°F of the predetermined condensing temperature except where FIG. 8 configuration is used. The preheater-descaler heat transfer surfaces are arranged for intimate contact with the solution and are electrically heated as by internally placed electrodes or by secondary coolant fluid conducted from the diffusion still. That is, a convenient sourse of preheat can be utilized dependent upon the situation and utilization of the diffusion still. In the embodiment shown secondary coolant from a reactor is utilized and is conducted through the descaler units through line 120 as shown in FIG. 6. After sufficient scale is deposited to a point where preheating capabilities are limited, switching valves 108 and 109 automatically switch the diffusion still feed to an alternate clean preheater-descaler unit so that further descaling and preheating operations can continue without interruption. Simultaneous with the automatic switch-over from the fully loaded unit to the alternate clean unit the electrically heated surfaces of the loaded unit are deactivated and concentrated effluent previously used to clean the alternate preheater-descaler is switched to the fully scaled unit. As heat transfer surfaces cool, the scale separated during thermal contraction from metal surfaces in the apparatus as shown in FIG. 6a.

Referring to FIGS. 6 and 6a mechanical descaler apparatus is shown to replace thermal descaling units 106 and 107. Thus, depending upon the manner and utilization of the system of the present invention mechanical scraping of the scale formations may in some instances, be preferable to the thermal descaling previously described. A presently preferred embodiment of such mechanical descaling apparatus is shown in FIGS. 6 and 7 as 206 and 207 and would replace the preheater-descaler units 106 and 107 as previously described in connection with FIG. 1. Only one such preheater-descaler unit is shown in detail since both would be similar. In the embodiment shown the source of preheat is the secondary coolant conducted to the preheater-descaler from the diffusion still when a nuclear powered system as shown in FIGS. 10 and 11 is utilized or with solid reactor core with a control rod at each tube. With mechanical scraping, electrical preheat, as previously described, can still be employed. Referring to FIGS. 6 and 7, each preheater-descaler includes a housing 202 with a tube sheet 203 positioned proximate the upper end thereof to define a header by means of which incoming heating fluid through line 120 is directed through a plurality of vertically oriented tubes 204 into a lower header 205 and from the unit through a heating fluid outlet line 206 to be exhausted from the system. Suitable control valves such as four-way valves 108 and 109 and proper routing valves are employed in the preheater-descaler assembly 105 to alternate the flow through the descaled unit as previously described to route feed water for preheating through the clean unit and effluent through the scaled unit which is to be cleaned. In the embodiment shown in FIGS. 6 and 7 the feed water passing through the preheater-descaler enters through feed line 208 and passes upwardly through the unit around the tubes 204 in counterflow to the heating fluid passing downwardly within the tubes. The descaled feed water which is thus preheated to the required temperature discussed above, then passes from the unit by means of outlet line 209 through the feed water line 68a of FIG. 1 and to the diffusion still. A scraper sheet 210 is positioned within the housing. The scraper sheet has a plurality of circular openings therethrough of a diameter greater than the outside diameter of each tube 204 such that the sheet is movable upwardly and downwardly along the tubes. Bearing means such as roller bearings 211 are placed on the sheet in bearing contact with a sufficient number of tubes to maintain the transverse alignment of the sheet to the tubes. A scraper assembly 212 each having a plurality of inwardly-downwardly inclined spring loaded scraper blades is mounted upon the scraper sheet surrounding each tube. Thus, as the scraper sheet moves upwardly the scraper blades ride on the tubes and as the sheet moves downwardly the scraper blades engage the tubes and scrape any scale and deposits therefrom. Reversal of the direction of the scraper sheet is obtained by mechanical means such as a drive unit 216 and linkage 217 as shown attached to the scraper sheet. Movement of the sheet and scrapers can also be obtained by reversal of fluid flow through the unit. Thus, during cleaning operation of the unit the feed water is routed to the clean unit and effluent is routed to the unit being cleaned. The effluent then enters the unit through effluent inlet line 214 and enters above the uppermost position of the scraper sheet 210 as determined by stops 215. The effluent forces the flow downward while still passing through the unit around the scraper blades through the openings in the scraper sheet surrounding each tube. The effluent picks up the scraped materials and carries them from the unit through conically shaped outlet 236. The desalination of water using the principal apparatus can be combined also with products other than electricity. A multi-product plant can be arranged to produce more than two products of economic significance. It may be feasible to increase the number of products produced in association with the subject invention resulting in lower conversion costs as joint costs can be spread over a large number of products.

There are a large number of products that may be obtained from a multi-product plant and this variety is determined essentially by the type of process used for desalination. A number of products can be derived from:

a. The residual brine using seawater as feed.
b. Salts and other minerals can be extracted for scale collected in descalers.
c. Chlorine from sodium chloride for the treatment of feed water or product water, or for the use by chemical industries.
d. Hydrochloric acid obtained from chlorine can be used for equipment descaling and for industrial purposes.

It can be seen that in addition to mechanical scraping the tubes are also cleaned by the thermal action discussed above. A specific illustrative example of the use of heat to obtain cleaning effect is shown in FIG. 6a, wherein a floating plate is attached to a plurality of concentric tubes of greater diameter than the feed tubes 204. The concentric tubes are perforated to allow passage of heated fluid to the feed tubes. A plurality of closely vertically spaced scraper blades are affixed to the concentric tubes in scraping contact with the exterior of the feed tube. The floating plate is then attached to a fixed point within the housing by a vertically extending rod 218 which expands and contracts in response to temperature changes and causes the floating plate to move upwardly and downwardly to produce a scraping action. The differential movement between cycles established by position of four-way switching valves is equal to the distance between adjacent scraper blades so that the entire tube is automatically scraped every other cycle.

In connection with the supply of preheat to the preheat-descaler assembly 105 in the alternative embodiment of the present invention, as shown in FIGS. 10, 11 and 8, means are shown for employing nuclear energy as the energy source of the system in remote areas, or in situations in which such an energy source is desirable for other reasons.

From a thermodynamic viewpoint energy may be supplied to the process described in the present invention both as heat and as work. For the transfer of energy as heat, differences in temperatures are necessary while work includes all those forms of energy in transit which are quantitatively and completely interconvertable. The interaction of energy supplied as work, e.g., pumps, and that supplied as heat, e.g., preheaters, in each of the unit operations described permits optimizing the recovery of input energy per pound of distillate produced. The figure of merit (Z) which is the measure of efficiency of a thermoelectric device, represents the most important combination of parameters for a thermoelectric device, represents the most important combination of parameters for a thermoelectric material. The higher the value of "Z," the lower the energy input necessary to pass one BTU between predetermined hot and cold junction temperature levels. Materials of "Z" equal to $3.5 \times 10^{-3}/°C$ are now commercially available and a concerted effort is being made among leading material producers to develop semiconductors which exhibit several times currently available "Z" values.

In addition to improvements in "Z" value, increasing the level of temperature exchange while maintaining a fixed temperature differential between diffusion still, evaporative and condensing surfaces significantly reduces thermoelement energy input requirements. By allowing the diffusion chamber of the thermoelectric diffusion still to operate at temperatures above 300°F, the net effect of a material of higher "Z" value operating at lower conventional temperature levels is achieved.

The final condensing stage of the diffusion section requires no heat pump work for evaporation since it utilizes the heat rejection of the next-to-last condensing stage for evaporation of vapor which is in turn condensed by incoming feed. Due to the configuration of the diffusion section, the surface area of the final stage of a multistage unit often represents a sizeable proportion of the total available and thus the "free heat" associated with the last stage may have a considerable effect on reducing the kw/1,000 gallons distillate produced. For example, a 6 stage diffusion still operating on sea water feed at 500 p.s.i.a. with thermoelements of "Z" value equal to $3 \times 10^{-3}/°C$ will require an estimated input to the thermal elements of the diffusion section of approximately 74 kw/1,000 gallons distillate. For this case approximately 46 percent of the total distillate produced is generated in the sixth or final stage.

Under the same operating conditions and provided the "Z" value were increased to $5 \times 10^{-3}/°C$, comparable input energy requirements would reduce some 27 percent to 54 kw/1,000 gallons distillate. The distillate produced in the final or sixth stage would represent approximately 39 percent of the total produced or some 16 percent below that for a "Z" equal to $3 \times 10^{-3}/°C$. Some of the advantage gained by increasing the diffusion still coefficient of performance through higher "Z" values is partially offset by a lower proportion of distillate formed in the final state. This is due to the lower value of input work necessary to pass heat between hot and cold junction, one-half of which ends up as heat rejected in the next to last stage. Notwithstanding as materials of higher "Z" values become available energy requirements will decrease accordingly to provide an operating system whose thermodynamic capabilities far exceed presently available distillation methods.

There is shown in FIG. 11 a system in accordance with the present invention utilizing a nuclear reactor 254 in combination with an alternative embodiment of the diffusion still 235 of the present invention as shown in FIG. 8. In FIG. 10 the reactor acts as a source of heat supply to the distillation still of FIG. 9. In the system shown in FIG. 10, a diffusion still in accordance with FIG. 8 is employed in an integrated aqueous homogeneous reactor system.

In the embodiment of the diffusion still 235 shown in FIG. 8 concentric sections of thermo elements are again employed but are arranged and constructed relative to the feed water inlet lines and nuclear heat sources to utilize otherwise wasted heat from a reactor system for the supply of heat to the still, for the generation of electric power consumed by the still and for a partial preheating of the feed water to the still. Thus, in FIG. 8 a series of thermo elements 220 and 221, evaporating 222 and condensing fins 223 across a narrow diffusion gap 230 are again employed as previously described. In this embodiment, however, a series of circumferentially spaced tubes 224 are positioned within the annular space 231 which is the hot side of the thermoelectric annulus 232. Similarly, a series of feed water pipes 227 are positioned within the annular space 233 which is the cool side of the thermoelectric annulus within which condensation of the distillate is occurring under pressure. That is, as discussed hereinbefore 225 is the hot junction of the thermoelectric generator and 226 is the cold junction or condensing side of the junction through the fin arrangement. By passing feed water through the condensing area such feed water acts as a heat sink in aid of condensation and also takes in heat as an additional preheating step. Nuclear shielding 229 is applied when harmful ionization of distillate or effluent might otherwise result. Suitable piping including headers for passage of the feed water to the feed water tubes 227, supply of feed water to the header and tubes and return of the heated feed water to the system are employed. Thus, for example, piping to the heat stabilizing section 52 of the still of FIG. 4 provides return of the feed water, while an inlet line 68a can be utilized directly from the preheat descaling unit 105. Insulator 228 maintains control of heat leakage from heat source 224 to heat sink 227. Electrical wiring 234 is provided in contact alternately to the P and N junctions of the thermo elements as shown in FIG. 8 to extract from the thermo elements 220 and 221 electricity generated by the heat supplied by the heat tubes 224 to help supply current demands for the thermoelectric elements 220 and 221 operating as heat pumps which source of power input to the thermo elements, as supplemental power, is shown dotted as power input lines 219 in FIG. 2. Such thermoelectric power generation is described, for example, in Heikes & Ure, "Thermoelectricity: Science & Engineering," Interscience Publishers, 1961.

As described hereinbefore the heated fluid to the heat pipes at the hot junction interface can be obtained from the coolant fluid of a remote nuclear reactor shown schematically in FIG. 11 as 253. In such a system the remaining functions of the system would be substantially as previously described in connection with the system of FIG. 1.

It should be noted that the heat supply tubes can also be an integrated reactor as a source of heat or an aqueous homogeneous reactor can be employed as part of an integrated system as shown in FIG. 10. In the system of FIG. 10 the fluid within the heat tubes 255 is a fluid fuel acting as a tubular reactor. The fluid nuclear fuel can be arranged as an aqueous homogeneous reactor, a molten salt, or liquid-metal fuel reactor.

If operated as an aqueous homogeneous reactor system, arranged in the manner illustrated in FIG. 10 enriched uranium salt in ordinary water serves as the fuel. In the system of FIG. 10, the diffusion still 256 is as previously described in connection with FIGS. 4 and 8. The heating liquid to the heat tubes 257 is supplied by a recirculating pump 264 through the line 255. The aqueous nuclear fuel then passes through the still 256 and is conducted therefrom through outlet line 263. Fuel control is achieved by supply from an aqueous fuel reprocessing apparatus 258 in response to a control valve 259 which senses the temperature differential of the inlet to outlet temperatures and recirculates through line 260 or supplies additional fuel through line 261 from the reservoir. Criticality is achieved by increasing the uranium concentration of the fuel solution and shut down is achieved by diluting the fuel with heavy water. Changes in power level due to changes in demand, can be self regulating. Thus, if a higher evaporation load is suddenly imposed in any given annular section, the fuel solution temperature will fall resulting in a large negative temperature coefficient. This would cause the reactivity to increase to meet the demand (Nuclear Reactor Engineeing, Van Nostrand, 1967, Glasstone and Sesonske). The reverse behavior results if the evaporation load is suddenly decreased. Rapid shutdown of the nuclear reaction can be achieved by dumping the solution to an adjacent vessel 252 which had a non-critical configuration. This system also permits integrating a continuous or batch reprocessing facility.

Shielding requirements are substantially reduced and dimensional changes due to irradiation and poisoning effect of gaseous fission products are eliminated.

To date dual purpose plants have been designed principally to produce electric power and desalinated water by attaching a evaporator to a thermal power plant in order to utilize low pressure exhaust from the steam turbine or hot gases in the case of diesel plants or gas turbines. The principal advantage of this type of dual purpose plant is represented by the savings and energy and therefore in fuel cost achieved in combining a power and water operation. However, a number of problems become apparent in dealing with such a dual purpose plant. The first problem relates to the difficulties in obtaining the most efficient utilization of the equipment because of the variations and demand schedules for water and electricity. Theoretically it is desirable that a dual purpose plant operate at base load during day and night. However, it has been shown that a balanced base-load operation of this character frequently does not exist in practice even though the electricity requirements of the desalination plant can help improve the daily load factor of an isolated power station.

The second problem pertains to the allocation of joint variable costs. There appears to be a tendency in operations towards charging most of the joint variable costs to the product which can afford to bear them in this case power. It has been argued that fuel costs for desalination may be calculated as the cost of extra fuel attributable to operating the power plant in conjunction with the evaporators rather than as a fuel costs for the same generating plant utilized for power production alone. Desalination may have to bear the sum of the fuel costs at times of low electricity demand when sufficient steam for desalination has to be made available either through the use of a back pressure turbine or by bypass throttle valve even though electrical demand might not warrant keeping the power plant at base load or the boilers loaded.

The third problem relates to obsolescence and technological improvements. When more efficient power generation is possible through newer and generally larger units it may be desirable within an electrical network to use the older and less efficient plants to meet peak demand requirements only. The base load requirement for power would be supplied by newer generating capacity and under these conditions power plants associated with desalination facilities might penalize the electrical network by being forced to run at a base load thus producing electricity which presumably will be relatively more expensive.

A concentric section as shown in FIG. 8 can also be employed as the starter column 14 in the previously described diffusion still of FIG. 4. Preheated feed would then be conducted from the starting column through an inlet line shown dotted as 240 in FIG. 1 while the heat source liquid would be conducted from the reactor or reservoir as through a heat source line shown dotted as 241 in FIG. 1.

Referring now to FIG. 9, there is shown a Peltier effect diffusion still in accordance with the present invention arranged for series flow in concentric elements for the separation of binary mixtures. For purposes of description the two components of the binary mixture can be described as component A and component B. The apparatus of FIG. 9 again provides for the separation of the components, as previously described, in connection with desalination specifically, by diffusion of the more volatile component across the narrow gap as influenced by a pressure differential generated by operation of the juxtaposed evaporating and condensing surfaces maintained at corresponding higher and lower temperature levels by the thermoelectric elements arranged either as shown in FIGS. 5 or 8. The prior art methods of separation of binary mixtures has primarily been by means of distillation. Under conditions of equal molal overflow, the relationship between flow rates above and below the feed tray of a distillation column depends upon the thermal condition of the feed. Thus, under conditions where the plurality of external flows and the thermal condition of the feed are fixed only one internal flow rate can be independently chosen.

There are many occasions where it is desirable to have independent control of several internal flows in process equipment designated primarily for separation of binary mixtures. Based on enthalpy balances describing a given separation by conventional distillation method, the number of theroretical plates of a distillation column (as determined by McCabe-Thiele method, for example) is a direct function of the physical properties of the constituents involved and design operating values. The number of steps required will determine the ultimate size of equipment required. By means of the apparatus of FIG. 9, it is possible to vary the pressure differential driving force or increase the rate of mass transfer at any given stage of binary separation by varying the temperature of the condensing and evaporating surfaces. By promoting mass transfer by means of the apparatus of FIG. 9, a more compact binary separation apparatus results. Although binary mixtures are discussed throughout it is to be understood that the present invention is equally applicable to multiple component fluids which can be separated one from the other by a plurality of separations as in FIG. 14.

Thus, the apparatus of FIG. 9 again includes a series of thermo element annuli 262 as previously described. The concentric series are identified as 1 through 4 in FIG. 9 and each corresponds to the section designated 12 in FIG. 4 with evaporating fins 240 and condensing fins 241 again arranged within the annular space at the respective hot and cold sides of the thermoelectric junctions. Headers labeled $D_{1-4}$ are provided to collect distillate from the condensing fins in each annulus while headers identified as $E_{1-4}$ are provided to collect the effluent from the evaporating fins in each annulus. Flow piping together with pumps 242 and expansion valves 243 is then provided for transmitting the distillate and effluent to the next succeeding annulus with the distillate flowing counter to the effluent. Thus, the distillate progresses inwardly through the series of annuli while the effluent flows outwardly. Accordingly, as shown schematically in FIG. 9 the feed passes through inlet line 244 to a series of preheaters 245 through the preheating jacket section 246 to the first annulus inlet line 247 to the third annulus 248. After the first separation the first distillate D4 passes through expansion valve 249, heat exchanger 250 and to the second annulus through line 251. From an original feed stock which can be designated as $D_o + E_o$ the enrichment in more volatile component D proceeds with decreasing subscript values, while the enrichment in the less volatile component of the original mixture proceeds with increasing subscript values. Thus is shown in FIG. 9.

Referring now to FIG. 12 there is shown, an embodiment of the diffusion still 279 of the present invention adapted as a Peltier effect heterogeneous catalytic reactor using again the concentric annular thermoelectric sections but with catalyst impregnated on one of the two finned surfaces. The reduced spacing of the parallel condensing and evaporating fins 275 and 276 makes steady state reaction effectively instantaneous. Thus, as shown in FIG. 12 the diffusion still 279 again includes the starter column 14, annular diffusion sections 270 and liquid inlet lines 271 to the upper end of the condenser-evaporator fin sections. The system can be pressurized through pressure line 272 from a suitable pressure cylinder or other source. Provision is made, however, for the removal of liquid vaporized in the passage through the sections by means of a vapor reactant discharge header 273. By means of the apparatus of FIG. 12 a Peltier effect concentric reactor is employed in heterogeneous catalyst as, for example, ZnO, NiO (semi-conductors) silica-alumina, gel, various metal combinations with alumina, and clays, is employed to promote vapor phase reactions. One of the reactants is introduced into diffusion still as a liquid or reactant dissolved in liquid through inlet line 271 and passes through a hot zone of the still for preheating and then into the still region through inlet header 278. By maintaining suitable reactor pressure and temperature in the annulus, reactant is diffused to the colder surface of the condensing fins 275 upon which pourous catalyst is impregnated as shown in section 12a, such catalytic coating being indicated as 275a. Vaporized reactant in liquid film flowing down the hot evaporating fins 276 diffuses into the annulus uniformly mixing with vapor phase reactants introduced into the annulus as a vapor through vapor inlet line 277 with reaction proceeding at the colder condensing finned surface which is catalyst coated. Examples of this type of reaction are as follows:

Alcohol Synthesis:

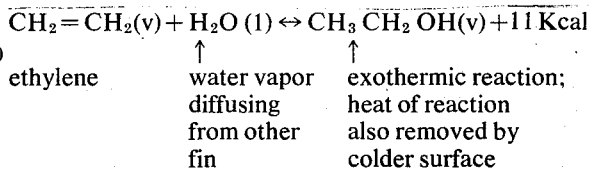

(l) Liquid phase reactant.
(v) Vapor phase reactant.

Aldehyde Synthesis:

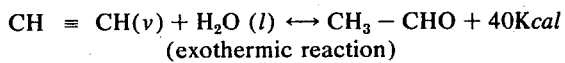

Ketone Synthesis:

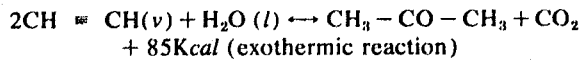

The above are characteristic of "Hydration" reactions. If all reactants are introduced in vapor phase then "dehydration" reactions occur of the type shown below, Ester Synthesis:

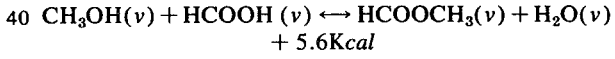

By maintaining the colder finned surface at a reaction pressure slightly above dewpoint of water vapor in reactor annulus so that water vapor migrates to the "colder" catalytic finned surface to take part in the dehydration reaction. Other examples of this type of reaction are as follows:

Alkyl-Aryl Synthesis:

Amine Synthesis:

Amide Synthesis:

Diene Synthesis:

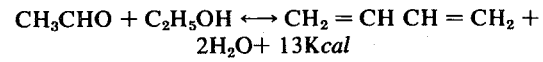

The Diene Synthesis is endothermic ($-13Kcal$) and requires heat from surroundings to promote reaction. Having condensation of a reactant on "colder" catalyst finned surface permits reaction heats to be partially supplied by the thermo elements.

The vapor phase reactants and products are recycled to improve conversion of desired product. By backmixing a portion of partially converted vapor phase product as liquid phase containing some absorbed product, control residence time distribution can be controlled to insure the desired product distribution from a continuous flow reactor. The single pass-packed bed reactor conventionally applied in heterogeneous vapor phase reactors generally involved complicated flow patterns coupled with appreciable concentration and thermal gradients. If the catalyst is sufficiently active a differential bed may be used but conversions are small. By making the diffusional resistance negligible all of the catalyst is exposed to reactant at the concentration of the reactor volume and the effectiveness factor is unity.

The configuration of the annulus may be similar to that shown in FIGS. 5 or 8. Where the inner condensing surface must be capable of adding or removing heat (to and from the heat sink) as required respectively for endothermic or exothermic chemical reactions, the configuration of FIG. 8 is required. The configuration of FIG. 5 may be used for some exothermic reactions only.

A recycle reactor in accordance with FIG. 12 using the Peltier effect concentric reactor design permits use of large amounts of catalyst relative to the reactor volume and conversions can range from a few percent to essentially complete reaction.

Vapor phase flow velocities can be selected to permit turbulent flow (through finned annuli) at relatively low mass velocities and maintain sufficient agitation of the reaction space so that bulk variables may be considered as close to uniformity as is mechanically feasible. Thus, the performance of the Peliter effect concentric reactor will exceed the performance capabilities of the continuous stirred tank reactor if adapted to surface catalyzed reactions.

The close spacing of the finned surfaces reduces diffusional effects to a minimum. Thus, with the diffusional resistance negligible, all of the catalyst surface is exposed to reactants at the concentration of the bulk reactor volume or in conventional terms the effectiveness factor is unity.

With respect to control of initial liquid phase reactant, the rate of diffusion to catalyst surface or from the catalyst surface in case of dehydration can also be used as a mechanism for controlling reaction rates or affecting vapor phase equilibria of reactants and products of diffusional control across a fixed gap.

There is shown in FIG. 14, a product reactant conversion and product separation system employing a Peltier effect concentric reactor of the present invention and a Peltier effect concentric still of the present invention which are utilized in a single apparatus to react feed inputs which result within the apparatus after reactions in intermediate products which are then separated into desired products different from the feed inputs as shown in FIG. 9. The Peltier effect reactor section and separation section of the apparatus are utilized in replacement of distillation columns. The reactor section of the system is a Peltier effect concentric reactor 279 as shown in FIG. 12 and previously described. The separator section is a Peltier effect separator as shown in FIG. 9 and previously described. Catalysts can be used in the reactor section or not depending upon the feed fluids and final products desired. Accordingly, (referring now to FIGS. 9, 12 and 14) through liquid inlet line 281, the liquid phase reactant such as described in connection with the apparatus of FIG. 12 passes into the system while vapor phase reactant is conducted into the system through gas inlet line 281.

Assume the following desired conversion, namely:

Then, if gaseous reactant A is introduced into line 281 corresponding to 277 of FIG. 12 and and liquid reactant B is introduced to line 281 corresponding to 271 of FIG. 12. Liquid products A, B, C, D corresponding to line 226 of FIG. 12 passes from reactor line 284 to section 283 for separation of components indicated as in FIG. 9, which vapor products A, B, C, D leaving reactor 273 of FIG. 12 passes from reactor line 282 to separation section 283 and a portion is recycled in line 286. Liquid effluent A, B, C, and D line 285 are recycled to 281. Liquid effluent product line 287 from distillation section 283 is fed to the next section 288 in series for separation from which distillate product C flowing in line 289 and effluent product D flowing in line 290 are then delivered to storage.

Referring now to FIG. 13 there is shown a diffusion still 310 adapted for operation by solar energy in accordance with the present invention for desalination or direct conversion to electrical energy. The annular diffusion sections are as previously described in connection with FIG. 4 but the source of electrical and heat energy to the still is supplied by focased solar rays. Thus, as shown in FIG. 13 solar rays are focused by a lens 300 to a portion of the exterior diffusion still surface 311 in direct thermal contact with the hot junction 301 of the thermoelectric elements. To accomplish this heat conversion the outermost annulus 309 of FIG. 13 is added to the still construction previously described in connection with FIG. 4. This outermost annulus 309 includes a circumferentially arranged series of thermoelectric elements 308, including P-type elements 302, N-type elements 303, a hot junction 301, and a cold junction 304. A preheating feed tube 305 is integrally formed in each cold junction 304. A suitably shaped lens 300 focuses the sun's rays on the hot junction 301. A selective wave length reflective coating 206 on the inside of the lens permits high frequency solar radiation to pass to the hot junction 301 and absorbs low wave length low wave length infra-red spectrum heat. In place of lens arrangement a solar panel can be employed. Such panels are known to the art, as for example, that described in "V.C. Wilson," "conversion of Heat To Electricity" by Thermionic Emission, J. Appl. Phys. Vol. 30, pp. 475. A high efficiency insulator 307 is located between the thermoelectric elements 308 to which the solar heat is directed and the final still annulus 309 which corresponds to the jacket section 75 of the apparatus of FIG. 4. The insulating layer 307 prevents heat flow from the outer annulus 309 into the thermoelectric solar generator and all heat collected on final condensation is used for feed perheat. Thus, in connection with FIG. 4 feed to the apparatus of FIG. 13 passes to the preheating tubes from the initial preheaters 71 and 72 while preheated-descaled feed passes into section 75. The solar thermoelectric section provides electric power by direct energy conversion to drive the thermoelectric elements of the diffusion still to thus eliminate the need for a power supply in remote areas.

I claim:

1. A chemical reactor diffusion separator apparatus comprising:
   a thermoelectric diffusion still including a series of endless walled sections, which sections are spaced to define endless spaces between an outer evaporating surface of one section and the juxtaposed condensing inner surface of the next adjacent section, said inner surface over substantially its entire area being closer to substantially the entire area of said outer surface than any other surface in said apparatus and less than one-half the height of said sections;
   heat pump means in said sections comprising thermoelectric elements;
   thermoelectric generating means comprising a series of thermoelectric elements positioned within at least one of such sections between the inner and outer walls thereof;
   means for conducting feed fluid as a liquid film to the evaporating surface of each of said sections;
   means for collecting condensate from the opposite condensing surface of each of said sections, said thermoelectric elements of said generating means within said sections having a high temperature junction and a low temperature junction and being so constructed and arranged as to maintain a temperature differential between the evaporating and condensing surfaces thereof;
   a catalytic material juxtaposed in operative relation to said condensing surfaces;
   said condensing surface being lower in temperature than said evaporating surface;
   means for maintaining said spaces between said sections at a predetermined positive pressure of approximately atmospheric and above;
   means for conducting a vapor reactant to said endless spaces;
   means for preheating and descaling said feed fluid prior to entering said diffusion still;
   high temperature heat supplying means for supplying sensible heat to the higher temperature junction of said thermoelectric elements of said thermoelectric generating means; and
   means for exhausting effluent from said apparatus.

2. The apparatus as defined in claim 1 in which said endless spaces are interconnected for serial flow of the feed fluid from one endless space to the next adjacent endless space.

3. A chemical conversion system comprising in combination:
   a thermoelectric diffusion still including a series of endless walled sections, which sections are spaced to define endless spaces between an outer evaporating surface of one section and the juxtaposed condensing inner surface of the next adjacent section, said inner surface over substantially its entire area being closer to substantially the entire area of said outer surface than any other surface in said apparatus and less than one-half the height of said sections;
   heat pump means in said sections comprising thermoelectric elements;
   thermoelectric generating means comprising a series of thermoelectric elements positioned within at least one of such sections between the inner and outer walls thereof;
   means for conducting feed fluid as a liquid film to the evaporating surface of each of said sections;
   means for collecting condensate from the opposite condensing surface of each of said sections, said thermoelectric elements of said generating means within said sections having a high temperature junction and a low temperature junction and being so constructed and arranged as to maintain a temperature differential between the evaporating and condensing surfaces thereof;
   said condensing surface being lower in temperature than said evaporating surface;
   means for maintaining said spaces between said sections at a predetermined positive pressure of approximately atmospheric and above;
   means for preheating and descaling said feed fluid prior to entering said diffusion still;
   high temperature heat supplying means for supplying sensible heat to the higher temperature junction of said thermoelectric elements of said thermoelectric generating means;
   means for exhausting effluent from said apparatus; and
   a catalytic reactor supplying separated products of reaction comprising:
   a thermoelectric diffusion still including a series of endless walled sections, which sections are spaced to define endless spaces between an outer evaporating surface of one section and the juxtaposed condensing inner surface of the next adjacent section, said inner surface over substantially its entire area being closer to substantially the entire area of said outer surface than any other surface in said apparatus and less than one-half the height of said sections;
   heat pump means in said sections comprising thermoelectric elements;
   thermoelectric generating means comprising a series of thermoelectric elements positioned within at least one of such sections between the inner and outer walls thereof;
   means for conducting feed fluid as a liquid film to the evaporating surface of each of said sections;
   means for collecting condensate from the opposite condensing surface of each of said sections, said thermoelectric elements of said generating means within said sections having a high temperature junction and a low temperature junction and being so constructed and arranged as to maintain a temperature differential between the evaporating and condensing surfaces thereof;
   a catalytic material justaposed in operative relation to said condensing surfaces;
   said condensing surface being lower in temperature than said evaporating surface;
   means for maintaining said spaces between said sections at a predetermined positive pressure of approximately atmospheric and above;
   means for conducting a vapor reactant to said endless spaces;
   means for preheating and descaling said feed fluid prior to entering said diffusion still;
   high temperature heat supplying means for supplying sensible heat to the higher temperature junction of said thermoelectric elements of said thermoelectric generating means;
means for exhausting effluent from said apparatus; and
said feed fluid being a binary mixture.

4. The apparatus of claim 1, wherein said catalytic material is impregnated on said condensing surfaces.

5. The apparatus of claim 3, wherein said catalytic material is impregnated on said condensing surfaces.

6. The apparatus of claim 3, wherein said still and reactor are in a unitary enclosure.

* * * * *